United States Patent
Uchiyama et al.

(10) Patent No.: US 10,500,776 B2
(45) Date of Patent: Dec. 10, 2019

(54) BRAKE CONTROL DEVICE FOR INJECTION MOLDING MACHINE AND BRAKE CONTROL METHOD FOR INJECTION MOLDING MACHINE

(71) Applicant: FANUC CORPORATION, Yamanashi (JP)

(72) Inventors: Tatsuhiro Uchiyama, Yamanashi-ken (JP); Junpei Maruyama, Yamanashi-ken (JP); Kazuyoshi Tanaka, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/050,302

(22) Filed: Jul. 31, 2018

(65) Prior Publication Data

US 2019/0039275 A1 Feb. 7, 2019

(30) Foreign Application Priority Data

Aug. 7, 2017 (JP) .................. 2017-152511

(51) Int. Cl.
  *B29C 45/76* (2006.01)
  *B29C 45/84* (2006.01)
  *B29C 45/66* (2006.01)
  *B29C 45/17* (2006.01)

(52) U.S. Cl.
  CPC .......... *B29C 45/7653* (2013.01); *B29C 45/66* (2013.01); *B29C 45/84* (2013.01);
  (Continued)

(58) Field of Classification Search
  CPC ... B29C 45/66; B29C 45/661; B29C 45/7653; B29C 45/84; B29C 2045/1792;
  (Continued)

(56) References Cited

U.S. PATENT DOCUMENTS 5,164,203 A * 11/1992 Tanaka .................. B29C 33/22
                                                            425/149
2008/0211126 A1* 9/2008 Kobayashi ......... B29O 45/7653
                                                            264/40.5

FOREIGN PATENT DOCUMENTS

JP       11320644 A      11/1999
JP    2009172923 A       8/2009
(Continued)

OTHER PUBLICATIONS

English Abstract and Machine Translation for Japanese Publication No. 2013-014054 A, published Jan. 24, 2013, 10 pgs.
(Continued)

*Primary Examiner* — James P Mackey
(74) *Attorney, Agent, or Firm* — Fredrikson & Byron, P.A.

(57) ABSTRACT

A brake control method for an injection molding machine includes the steps of obtaining mold clamping force information indicating the mold clamping force of a mold opening/closing mechanism and determining whether or not the mold clamping force of the mold opening/closing mechanism exceeds a predetermined value, based on the mold clamping force information. When the mold clamping force of the mold opening/closing mechanism does not exceed the predetermined value and when a servo amplifier cuts off the supply of power to a servomotor that drives the mold opening/closing mechanism, a brake mechanism for applying braking force to the mold opening/closing mechanism is actuated. On the other hand, when the mold clamping force of the mold opening/closing mechanism exceeds the predetermined value, the brake mechanism will not be actuated.

12 Claims, 4 Drawing Sheets

(52) U.S. Cl.
CPC ........................ *B29C 45/661* (2013.01); *B29C 2045/1792* (2013.01); *B29C 2045/665* (2013.01); *B29C 2945/76013* (2013.01); *B29C 2945/76391* (2013.01); *B29C 2945/76448* (2013.01); *B29C 2945/76505* (2013.01); *B29C 2945/76869* (2013.01)

(58) Field of Classification Search
CPC ........... B29C 2945/76013; B29C 2945/76391; B29C 2945/76869
USPC ........................................................ 425/214
See application file for complete search history.

(56) References Cited

FOREIGN PATENT DOCUMENTS

| | | | |
|---|---|---|---|
| JP | 2010137542 A | 6/2010 | |
| JP | 201314054 A | 1/2013 | |
| JP | 2015147361 A | 8/2015 | |

OTHER PUBLICATIONS

English Abstract and Machine Translation for Japanese Publication No. 2010-137542 A, published Jun. 24, 2010, 17 pgs.
English Abstract and Machine Translation for Japanese Publication No. JPH11-320644 A, published Nov. 24, 1999, 9 pgs.
English Abstract and Machine Translation for Japanese Publication No. 2015-147361 A, published Aug. 20, 2015, 16 pgs.
English Abstract and Machine Translation for Japanese Publication No. 2009-172923 A, published Aug. 6, 2009, 13 pgs.

* cited by examiner

BRAKE CONTROL DEVICE FOR INJECTION MOLDING MACHINE AND BRAKE CONTROL METHOD FOR INJECTION MOLDING MACHINE

CROSS-REFERENCE TO RELATED APPLICATION

This application is based upon and claims the benefit of priority from Japanese Patent Application No. 2017-152511 filed on Aug. 7, 2017, the contents of which are incorporated herein by reference.

BACKGROUND OF THE INVENTION

Field of the Invention

The present invention relates to a brake control device for an injection molding machine that applies a braking force to a mold opening/closing mechanism for opening and closing a mold and a brake control method for an injection molding machine.

Description of the Related Art

Japanese Laid-Open Patent Publication No. 2013-014054 discloses a brake unit that limits rotation of a motor unit when no current is supplied to the motor unit for opening and closing a mold.

SUMMARY OF THE INVENTION

When the safety door of the injection molding machine opens, power supply to the motor for driving the mold opening/closing mechanism is stopped. Therefore, when the safety door is opened while the clamping force is being applied to the mold, the supply of power to the motor for driving the mold opening/closing mechanism is interrupted, so that the mold clamping force is released. At this time, if a braking force is applied to the mold opening/closing mechanism when power is not being supplied to the motor as in Japanese Laid-Open Patent Publication No. 2013-014054, a load acts on the brake mechanism as the mold clamping force is released. This load accompanying the release of the mold clamping force is large, which may damage or break the brake mechanism.

It is therefore an object of the present invention to provide a brake control device for an injection molding machine that suppresses deterioration or breakage of a brake mechanism that applies a braking force to a mold opening/closing mechanism as well as providing a brake control method for an injection molding machine.

A first aspect of the present invention resides in a brake control device for an injection molding machine that includes a mold opening/closing mechanism configured to open and close a mold and generate mold clamping force, an actuator configured to drive the mold opening/closing mechanism, a power supply unit configured to supply power to the actuator, and a brake mechanism configured to apply braking force to the mold opening/closing mechanism, comprising: a mold clamping force obtainer configured to obtain mold clamping force information indicating the mold clamping force of the mold opening/closing mechanism; a mold clamping force decider configured to determine whether or not the mold clamping force of the mold opening/closing mechanism exceeds a predetermined value, based on the mold clamping force information; and a brake controller configured to actuate the brake mechanism when the mold clamping force decider determines that the mold clamping force of the mold opening/closing mechanism does not exceed the predetermined value and when the power supply unit cuts off the supply of power to the actuator, and configured not to actuate the brake mechanism when the mold clamping force decider determines that the mold clamping force of the mold opening/closing mechanism exceeds the predetermined value.

A second aspect of the present invention resides in a brake control method for an injection molding machine that includes a mold opening/closing mechanism configured to open and close a mold and generate mold clamping force, an actuator configured to drive the mold opening/closing mechanism, a power supply unit configured to supply power to the actuator, and a brake mechanism configured to apply braking force to the mold opening/closing mechanism, the method comprising: a mold clamping force obtaining step of obtaining mold clamping force information indicating the mold clamping force of the mold opening/closing mechanism; a mold clamping force deciding step of determining whether or not the mold clamping force of the mold opening/closing mechanism exceeds a predetermined value, based on the mold clamping force information; and a brake controlling step of actuating the brake mechanism when the mold clamping force deciding step determines that the mold clamping force of the mold opening/closing mechanism does not exceed the predetermined value and when the power supply unit cuts off the supply of power to the actuator, and not actuating the brake mechanism when the mold clamping force deciding step determines that the mold clamping force of the mold opening/closing mechanism exceeds the predetermined value.

According to the present invention, when the mold clamping force of the mold opening/closing mechanism exceeds a predetermined value and when the supply of power to the actuator is cut off, the brake mechanism is not operated, so that it is possible to prevent the brake mechanism from being deteriorated or broken. In addition, when the mold clamping force of the mold opening/closing mechanism exceeds the predetermined value, the mold is in a closed state, so that operator's safety can be secured without operating the brake mechanism.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The brake control device for an injection molding machine and the brake control method for an injection molding machine according to the present invention will be detailed hereinbelow by describing preferred embodiments with reference to the accompanying drawings.

First Embodiment

Figure 1:
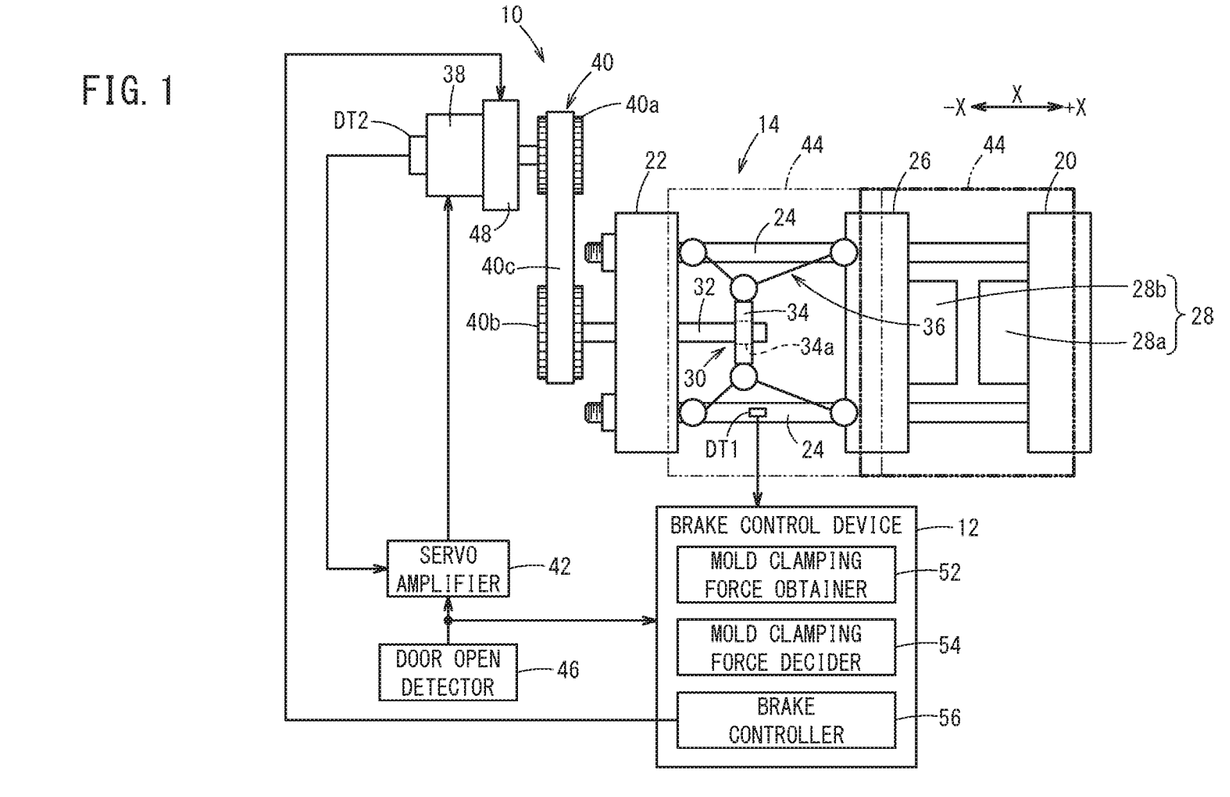
FIG. 1 is a schematic configuration diagram of an injection molding machine with a brake control device of an embodiment.

FIG. 1 is a schematic configuration diagram of an injection molding machine 10 and a brake control device 12 for the injection molding machine 10. A mold clamping unit 14 of the injection molding machine 10 has a stationary platen 20, a rear platen 22 and four tie bars 24. The four tie bars 24 connect the stationary platen 20 and the rear platen 22. The four tie bars 24 are arranged so that their axial directions are parallel to the X-direction. A moving platen 26 is provided between the stationary platen 20 and the rear platen 22. The moving platen 26 can move in the axial directions (X-directions) of the tie bars 24 along the four tie bars 24.

A mold 28 is attached between the stationary platen 20 and the moving platen 26. The mold 28 is composed of a stationary mold half 28a and a moving mold half 28b. The stationary mold half 28a is attached to the stationary platen 20 on the side facing moving platen 26, and the moving mold half 28b is attached to the moving platen 26 on the side facing the stationary platen 20.

The mold clamping unit 14 includes a mold opening/closing mechanism 30 that opens and closes the mold 28 and applies clamping force. The mold opening/closing mechanism 30 includes a ball screw 32, a crosshead 34 having a nut 34a screwed on the ball screw 32, a toggle mechanism 36 provided between the rear platen 22 and the moving platen 26 and coupled with the crosshead 34. The ball screw 32 is rotatably attached to the rear platen 22 so as not to move in the axial direction. The nut 34a of the crosshead 34 is screwed on the ball screw 32 at a position on the positive X-direction side of the rear platen 22.

As the ball screw 32 rotates, the crosshead 34 moves in the X-direction. When the ball screw 32 rotates forward, the crosshead 34 moves in the positive X-direction, so that the toggle mechanism 36 extends in the X-direction. As a result, the moving platen 26 and the moving mold half 28b move in the positive X-direction (the direction in which the mold 28 is closed), and the moving mold half 28b contacts the stationary mold half 28a (the mold 28 is closed). Then, as the ball screw 32 further rotates forward, the crosshead 34 moves more in the positive X-direction so as to generate mold clamping force in the mold 28.

Conversely, when the ball screw 32 rotates in reverse, the crosshead 34 moves in the negative X-direction, so that the toggle mechanism 36 contracts in the X-direction. As a result, the moving platen 26 and the moving mold half 28b move in the negative X-direction (the direction in which the mold 28 opens). When the ball screw 32 rotates in the reverse direction in the state where the mold clamping force is generated in the mold 28, the crosshead 34 moves in the negative X-direction, so that the mold clamping force is released and then the mold 28 opens. A mold clamping force detector DT1 for detecting mold clamping force is provided for the tie bar 24.

The ball screw 32 is rotated by a mold opening/closing servomotor (actuator) 38 provided in the mold clamping unit 14. The rotational force of the servomotor (motor) 38 is transmitted to the ball screw 32 via a power transmission 40. Therefore, as the servomotor 38 rotates forward, its rotational force is transmitted to the ball screw 32 so as to move the moving platen 26 and the moving mold half 28b in the positive X-direction (the direction in which the mold 28 is closed). When the servomotor 38 rotates in reverse, its rotational force is transmitted to the ball screw 32 so as to move the moving platen 26 and the moving mold half 28b in the negative X-direction (the direction in which the mold 28 is opened).

The power transmission 40 includes a pulley 40a provided on the rotation shaft (output shaft) of the servomotor 38, a pulley 40b provided on the ball screw 32 on the negative X-direction side with respect to the rear platen 22, and an endless belt 40c wound between the pulleys 40a, 40b.

A servo amplifier (power supply unit) 42 supplies power (electric power) to the servomotor 38 to drive the servomotor 38. The servo amplifier 42 controls the servomotor 38 in accordance with command signals (command signals representing positional instructions or speed instructions) from an unillustrated control device of the injection molding machine 10. The servomotor 38 includes a rotational position detector DT2 for detecting the rotational position of the servomotor 38 (specifically, the rotational position of the rotating shaft of the servomotor 38). The servo amplifier 42 performs feedback-control on the servomotor 38 based on the rotational position detected by the rotational position detector DT2. The rotational speed of the servomotor 38 can also be obtained by detecting the rotational position.

Attached to the mold clamping unit 14 is an unillustrated cover in order to prevent the operator from touching the moving parts (the moving platen 26, mold opening/closing mechanism 30, moving mold half 28b, etc.) in the mold clamping unit 14. This cover has an openable safety door 44. The safety door 44 enables an operator to access the mold 28. When the safety door 44 is opened, the mold 28 is exposed so that the operator can access the mold 28. When the safety door 44 is closed, the operator cannot access the mold 28. The thick two-dot chain line shown in FIG. 1 indicates the state in which the safety door 44 is closed, and the thin two-dot chain line indicates the state in which the safety door 44 is opened.

The safety door 44 has an unillustrated position detector such as a limit switch to detect the position of the safety door 44. Based on the state signal of the position detector, a door open detector 46 detects an operator's door opening/closing operation.

When the door open detector 46 detects that the safety door 44 is opened by the operator, the door open detector 46 outputs a power cutoff signal (door open operation signal) to the servo amplifier 42 and the brake control device 12. When receiving the power cutoff signal, the servo amplifier 42 cuts off the power supply to the servomotor 38. As a result, the servomotor 38 becomes rotatable by an external force. So, when a mold clamping force is generated in the mold opening/closing mechanism 30 and when the toggle mechanism 36 is not completely extended (is not located at the dead point), the toggle mechanism 36 contracts and the mold clamping force is released.

The servomotor 38 is provided with a brake mechanism 48 that applies a braking force to the rotating shaft of the servomotor 38 to stop rotation of the rotating shaft of the servomotor 38. The brake mechanism 48 applies a braking force to the mold opening/closing mechanism 30 so as to stop the crosshead 34 moving. The brake mechanism 48 may be incorporated (integrated) in the servomotor 38 or may be attached outside the servomotor 38. The brake mechanism 48 is controlled by the brake control device 12.

The brake control device 12 includes a mold clamping force obtainer 52, a mold clamping force decider 54 and a brake controller 56.

The mold clamping force obtainer 52 obtains mold clamping force information indicating mold clamping force (clamping force generated in the mold 28) of the mold opening/closing mechanism 30. The mold clamping force obtainer 52 obtains the mold clamping force detected by the mold clamping force detector DT1 provided in the tie bar 24 as the mold clamping force information. When a mold clamping force is generated in the mold 28, the tie bar 24 extends according to the mold clamping force, so that the mold clamping force detector DT1 can detect the mold clamping force by detecting the elongation of the tie bar 24. The mold clamping force obtainer 52 outputs the acquired mold clamping force information to the mold clamping force decider 54. The mold clamping force is obtained from the reaction force or counterforce of the elongation of the tie bar 24.

Based on the mold clamping force information acquired by the mold clamping force obtainer 52, the mold clamping force decider 54 determines whether or not the mold clamping force of the mold opening/closing mechanism 30 exceeds a predetermined value. When determining that the mold clamping force of the mold opening/closing mechanism 30 exceeds the predetermined value, the mold clamping force decider 54 outputs a signal indicating that the mold clamping force exceeds the predetermined value to the brake controller 56.

When the mold clamping force decider 54 determines that the mold clamping force of the mold opening/closing mechanism 30 has not exceeded the predetermined value, and when the servo amplifier 42 cuts off the power supply to the servomotor 38, the brake controller 56 actuates the brake mechanism 48. Thus, before the servo amplifier 42 cuts off the supply of power to the servomotor 38, a braking force is applied to the mold opening/closing mechanism 30. Therefore, it is possible to prevent the moving mold half 28*b* from moving when the safety door 44 is open. When the power cutoff signal is sent from the door open detector 46, the brake controller 56 determines that the servo amplifier 42 cuts off the power supply to the servomotor 38.

On the other hand, when the mold clamping force decider 54 determines that the mold clamping force of the mold opening/closing mechanism 30 exceeds the predetermined value, the brake controller 56 will not actuate the brake mechanism 48. Thus, when it is determined by the mold clamping force decider 54 that the mold clamping force of the mold opening/closing mechanism 30 exceeds the predetermined value, no braking force is applied to the mold opening/closing mechanism 30. Therefore, even when the servo amplifier 42 shuts off the power supply to the servomotor 38, if the mold clamping force of the mold opening/closing mechanism 30 exceeds the predetermined value, no braking force is applied to the mold opening/closing mechanism 30. Since the mold 28 is in a completely closed state when the mold clamping force is generated, the mold 28 will hardly be moved and remains in a closed state even if no braking force is applied to the mold opening/closing mechanism 30 with the mold clamping force released.

Herein, in the case where the mold clamping force decider 54 has determined that the clamping force of the mold opening/closing mechanism 30 exceeds the predetermined value, if the brake mechanism 48 is actuated with the supply of power to the servomotor 38 cut off, the mold clamping force equal to or greater than the predetermined value directly acts on the brake mechanism 48 as a load from the mold opening/closing mechanism 30. Therefore, the brake mechanism 48 is damaged, and in some cases the brake mechanism 48 is broken.

However, in the present embodiment, when the mold clamping force of the mold opening/closing mechanism 30 exceeds the predetermined value, the brake mechanism 48 is not actuated, so that it is possible to suppress deterioration and breakage of the brake mechanism 48 due to release of the mold clamping force. In addition, when the mold clamping force of the mold opening/closing mechanism 30 exceeds the predetermined value, the mold 28 is in a closed state, so that operator's safety can be ensured without actuating the brake mechanism 48.

Even if mold clamping force is generated, when the toggle mechanism 36 is fully extended (located at the dead point), the mold clamping force will not be released even when the supply of power to the servomotor 38 from the servo amplifier 42 is cut off, in one word, or the servomotor 38 is in a rotatable state. This means that the toggle mechanism 36 is kept in the extended state. Therefore, even if the braking force applied to the mold opening/closing mechanism 30 is made null, the mold 28 will not move, so that operator's safety can be secured.

Figure 2:
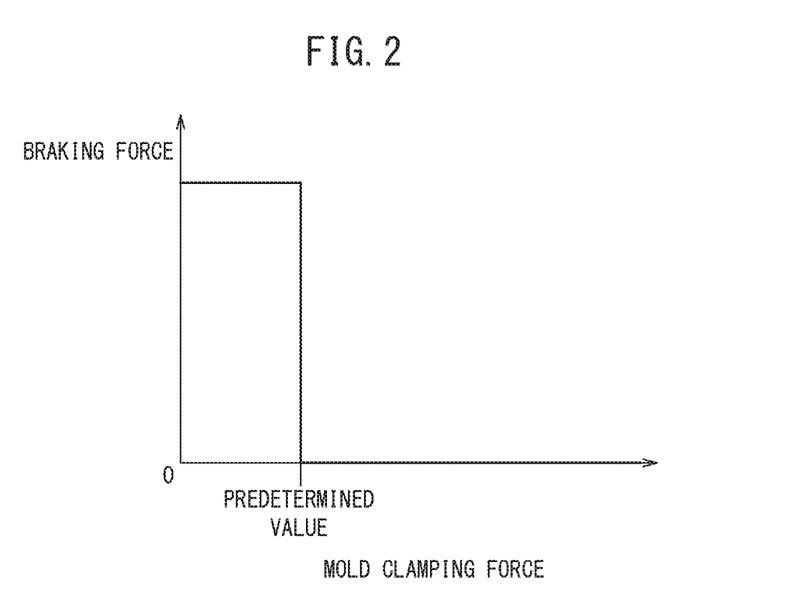
FIG. 2 is a diagram showing the relationship between the mold clamping force of a mold opening/closing mechanism and the braking force applied to the mold opening/closing mechanism when the servo amplifier interrupts the supply of power to a servomotor.

FIG. 2 is a diagram showing the relationship between the mold clamping force of the mold opening/closing mechanism 30 and the braking force applied to the mold opening/closing mechanism 30 when the servo amplifier 42 cuts off the supply of power to the servomotor 38.

Figure 3:
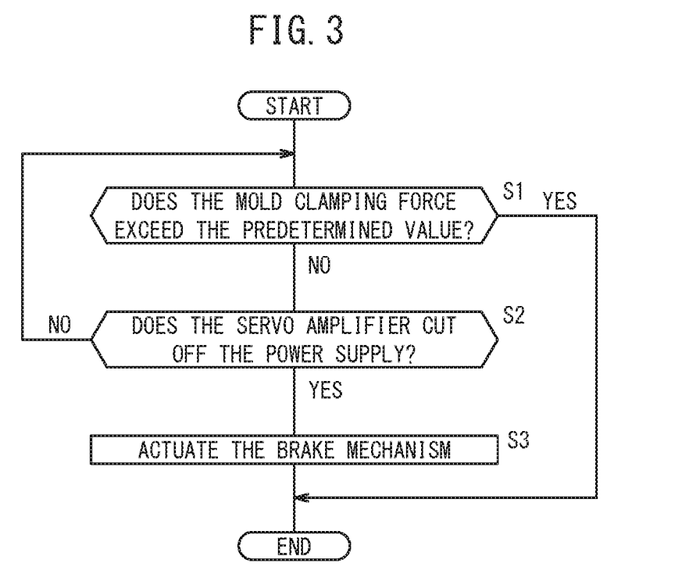
FIG. 3 is a flowchart showing the operation of the brake control apparatus shown in FIG. 1.

Next, the operation of the brake control device 12 of the present embodiment will be described with reference to the flowchart shown in FIG. 3. It is assumed that the mold clamping force detector DT1 detects mold clamping force at a constant cycle and that the mold clamping force obtainer 52 obtains the mold clamping force information indicating the mold clamping force detected by the mold clamping force detector DT1 at a constant cycle.

At step S1, the mold clamping force decider 54 determines whether or not the mold clamping force of the mold opening/closing mechanism 30 exceeds the predetermined value. If it is determined at step S1 that the mold clamping force exceeds the predetermined value, the present operation is terminated. If it is determined that the mold clamping force does not exceed the predetermined value, the control proceeds to step S2.

At step S2, the brake controller 56 determines whether or not the servo amplifier 42 cuts off the supply of power to the servomotor 38. This decision is made based on whether or not a power cutoff signal has been sent from the door open detector 46. If it is determined at step S2 that the supply of power to the servomotor 38 is not cut off, the control returns to step S1. If it is determined to cut off the power supply to the servomotor 38, the control proceeds to step S3.

At step S3, the brake controller 56 actuates the brake mechanism 48 to apply braking force to the mold opening/closing mechanism 30, and terminates this operation. It should be noted that the operation at step S3 is executed before the servo amplifier 42 cuts off the supply of power to the servomotor 38.

In this way, when the mold clamping force of the mold opening/closing mechanism 30 exceeds the predetermined value, and when the supply of power to the servomotor 38 is cut off, the brake mechanism 48 is not actuated, so that it is possible to suppress deterioration and breakage of the brake mechanism 48. In addition, when the mold clamping force of the mold opening/closing mechanism 30 exceeds the predetermined value, the mold 28 is in a closed state, so that operator's safety can be ensured without actuating the brake mechanism 48.

VARIATIONAL EXAMPLES

The above embodiment can be modified as follows.

Variational Example 1

Figure 4:
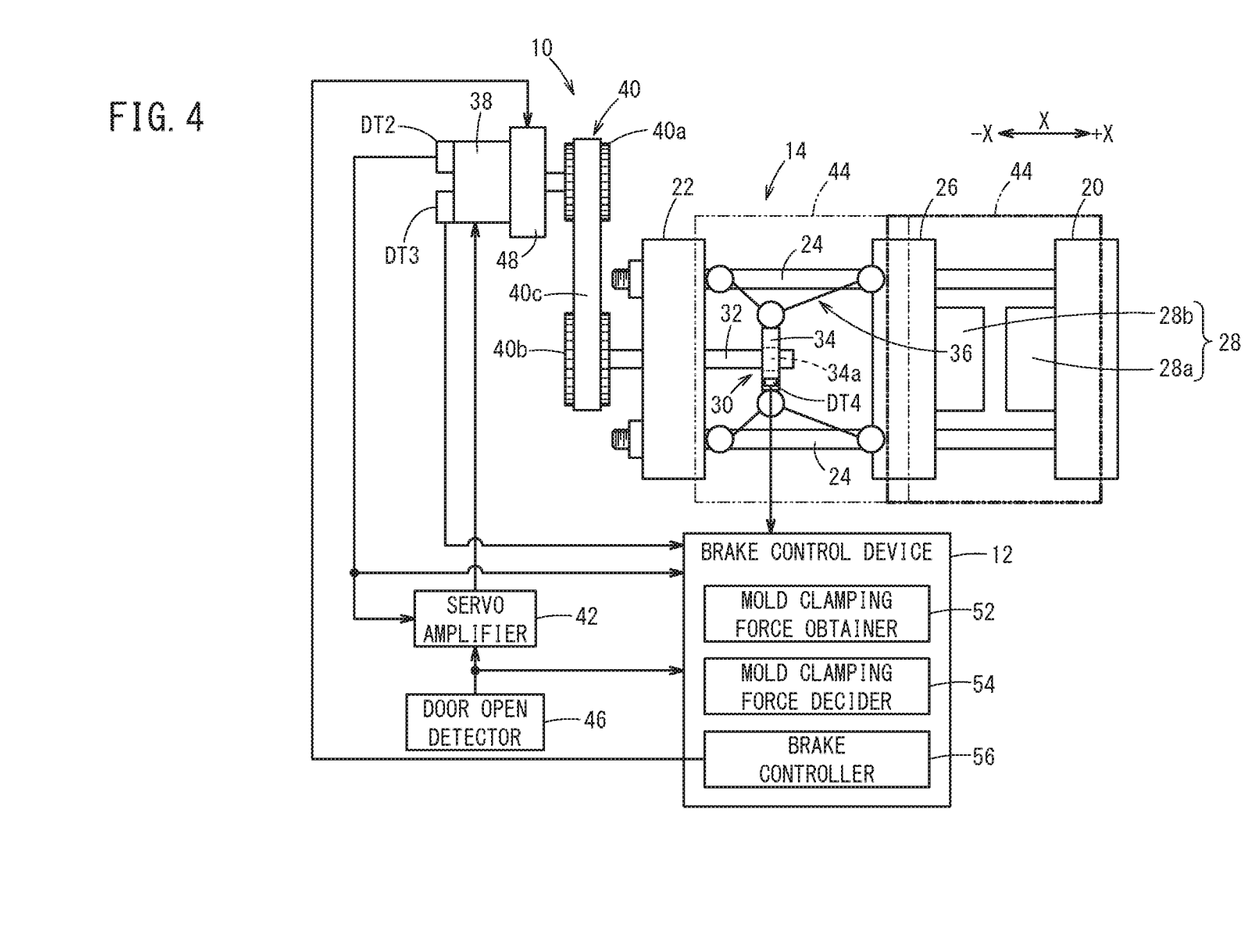
FIG. 4 is a diagram for explaining Variational Example 1.

Though in the above embodiment, the mold clamping force detector DT1 for directly detecting the mold clamping force of the mold opening/closing mechanism 30 is provided, a rotational position detector DT2 for detecting the rotational position of the servomotor 38 may be used instead of the mold clamping force detector DT1. Alternatively, instead of the mold clamping force detector DT1, a torque detector DT3 for detecting the torque generated in the servomotor 38 or a position detector DT4 for detecting the position of the ball screw 32 of the crosshead 34 with respect to the axial direction may be used, as shown in FIG. 4.

Use of the rotational position detector DT2 for detecting the rotational position of the servomotor 38 makes it possible to know the position of the crosshead 34 in the axial direction of the ball screw 32, which provides information on the mold clamping force of the mold opening/closing mechanism 30. Alternatively, use of the position detector DT4 to directly detect the position of the crosshead 34 in the axial direction of the ball screw 32 makes it possible to know the mold clamping force of the mold opening/closing mechanism 30. Further, use of the torque detector DT3 to detect the torque generated in the servomotor 38 makes it possible to detect the mold clamping force of the mold opening/closing mechanism 30. Thus, the rotational position of the servomotor 38, the torque of the servomotor 38 and the position of the crosshead 34 in the axial direction of the ball screw 32 each have a correlation with the mold clamping force of the mold opening/closing mechanism 30. Here, the torque detector DT3 may obtain information on torque by detecting the current flowing through the servomotor 38.

Variational Example 2

The above embodiment is configured so that a power cutoff signal is transmitted from the door open detector 46 to the servo amplifier 42 and the brake control device 12 when an operation to open the safety door 44 is performed. However, the present invention should not be limited to this. For example, it is possible to provide a configuration in which a power cutoff signal from the door open detector 46 may be output only to the servo amplifier 42, which in turn may output a power cutoff signal to the brake control device 12. It is possible to provide another configuration in which a power cutoff signal from the door open detector 46 may be sent to the controller of the injection molding machine 10, which in turn may output a power cutoff signal to the servo amplifier 42 and the brake control device 12.

Variational Example 3

In the above embodiment, it is presumed that the safety door 44 is opened. However, regardless of the opening of the safety door 44, the above system may be also applied to a case where the servo amplifier 42 stops (cuts off) the supply of power to the servomotor 38. In this case, for example, when stopping the supply of power to the servomotor 38, the servo amplifier 42 only has to output a power cutoff signal to the brake control device 12.

Variational Example 4

In the above embodiment, for simplicity, the brake control device 12 is described as a controller different from the controller for controlling the injection molding machine 10. However, the controller for controlling the injection molding machine 10 may include the brake control device 12.

Variational Example 5

The above variational examples 1 to 4 may be arbitrarily combined to provide an additional configuration.

Technical Ideas Obtained from Embodiment

Technical ideas that can be grasped from the above embodiment and variational examples 1 to 5 are described below.

<First Technical Idea>

The injection molding machine (10) includes the mold opening/closing mechanism (30) configured to open and close the mold (28) and generate mold clamping force, the actuator (38) configured to drive the mold opening/closing mechanism (30), the power supply unit (42) configured to supply power to the actuator (38), and the brake mechanism (48) configured to apply braking force to the mold opening/closing mechanism (30). The brake control device (12) for the injection molding machine (10) includes: the mold clamping force obtainer (52) configured to obtain mold clamping force information indicating the mold clamping force of the mold opening/closing mechanism (30); the mold clamping force decider (54) configured to determine whether or not the mold clamping force of the mold opening/closing mechanism (30) exceeds a predetermined value, based on the mold clamping force information; and the brake controller (56) configured to actuate the brake mechanism (48) when the mold clamping force decider (54) determines that the mold clamping force of the mold opening/closing mechanism (30) does not exceed the predetermined value and when the power supply unit (42) cuts off the supply of power to the actuator (38), and configured not to actuate the brake mechanism (48) when the mold clamping force decider (54) determines that the mold clamping force of the mold opening/closing mechanism (30) exceeds the predetermined value.

In this configuration, when the mold clamping force of the mold opening/closing mechanism (30) exceeds the predetermined value and when the supply of power to the actuator (38) is cut off, the brake mechanism (48) is not operated, so that it is possible to prevent the brake mechanism (48) from being deteriorated or broken. Further, when the mold clamping force of the mold opening/closing mechanism (30) exceeds the predetermined value, the mold (28) is in a closed state, so that operator's safety can be secured without operating the brake mechanism (48).

The injection molding machine (10) may include the mold clamping force detector (DT1) configured to detect the mold clamping force of the mold opening/closing mechanism (30). The mold clamping force obtainer (52) may be configured to obtain the mold clamping force detected by the mold clamping force detector (DT1) as the mold clamping force information. Thus, it is possible to obtain accurate mold clamping force information.

The actuator (38) may be a motor, and the injection molding machine (10) may include the torque detector (DT3) configured to detect the torque of the motor (38). The mold clamping force obtainer (52) may be configured to obtain the torque detected by the torque detector (DT3) as the mold clamping force information. Thus, it is possible to obtain accurate mold clamping force information.

The actuator (38) may be a motor, and the injection molding machine (10) may include the rotational position detector (DT2) configured to detect the rotational position of the motor (38). The mold clamping force obtainer (52) may be configured to obtain the rotational position detected by the rotational position detector (DT2) as the mold clamping force information. Thus, it is possible to obtain accurate mold clamping force information.

The mold opening/closing mechanism (30) may include the ball screw (32), the crosshead (34) including the nut (34a) screwed with the ball screw (32) and the toggle mechanism (36) configured to open and close the mold (28) by moving the crosshead (34) in the axial direction of the ball screw (32). The injection molding machine (10) may include the position detector (DT4) configured to detect the position of the crosshead (34) in the axial direction. The mold clamping force obtainer (52) may be configured to obtain the position of the crosshead (34) detected by the position detector (DT4) with respect to the axial direction as the mold clamping force information. Thus, it is possible to obtain accurate mold clamping force information.

The injection molding machine (10) may include the openable safety door (44) so as to enable an operator to access the mold (28). The power supply unit (42) may be configured to cut off the supply of power to the actuator (38) when the safety door (44) is opened. This configuration can secure operator's safety.

<Second Technical Idea>

The injection molding machine (10) includes the mold opening/closing mechanism (30) configured to open and close the mold (28) and generate mold clamping force, the actuator (38) configured to drive the mold opening/closing mechanism (30), the power supply unit (42) configured to supply power to the actuator (38), and the brake mechanism (48) configured to apply braking force to the mold opening/closing mechanism (30). The brake control method for the injection molding machine (10) comprises: a mold clamping force obtaining step of obtaining mold clamping force information indicating the mold clamping force of the mold opening/closing mechanism (30); a mold clamping force deciding step of determining whether or not the mold clamping force of the mold opening/closing mechanism (30) exceeds a predetermined value, based on the mold clamping force information; and a brake controlling step of, actuating the brake mechanism (48) when the mold clamping force deciding step determines that the mold clamping force of the mold opening/closing mechanism (30) does not exceed the predetermined value and when the power supply unit (42) cuts off the supply of power to the actuator (38), and not actuating the brake mechanism (48) when the mold clamping force deciding step determines that the mold clamping force of the mold opening/closing mechanism (30) exceeds the predetermined value.

In this configuration, when the mold clamping force of the mold opening/closing mechanism (30) exceeds the predetermined value and when the supply of power to the actuator (38) is cut off, the brake mechanism (48) is not operated, so that it is possible to prevent the brake mechanism (48) from being deteriorated or broken. Further, when the mold clamping force of the mold opening/closing mechanism (30) exceeds the predetermined value, the mold (28) is in a closed state, so that operator's safety can be secured without operating the brake mechanism (48).

The injection molding machine (10) may include the mold clamping force detector (DT1) configured to detect the mold clamping force of the mold opening/closing mechanism (30). The mold clamping force obtaining step may obtain the mold clamping force detected by the mold clamping force detector (DT1) as the mold clamping force information. Thus, it is possible to obtain accurate mold clamping force information.

The actuator (38) may be a motor, and the injection molding machine (10) may include the torque detector (DT3) configured to detect the torque of the motor (38). The mold clamping force obtaining step may obtain the torque detected by the torque detector (DT3) as the mold clamping force information. Thus, it is possible to obtain accurate mold clamping force information.

The actuator (38) may be a motor, and the injection molding machine (10) may include the rotational position detector (DT2) configured to detect the rotational position of the motor (38). The mold clamping force obtaining step may obtain the rotational position detected by the rotational position detector (DT2) as the mold clamping force information. Thus, it is possible to obtain accurate mold clamping force information.

The mold opening/closing mechanism (30) may include the ball screw (32), the crosshead (34) including the nut (34a) screwed with the ball screw (32) and the toggle mechanism (36) configured to open and close the mold (28) by moving the crosshead (34) in the axial direction of the ball screw (32). The injection molding machine (10) may include the position detector (DT4) configured to detect the position of the crosshead (34) in the axial direction. The mold clamping force obtaining step may obtain the position of the crosshead (34) detected by the position detector (DT4) with respect to the axial direction as the mold clamping force information. Thus, it is possible to obtain accurate mold clamping force information.

The injection molding machine (10) may include the openable safety door (44) so as to enable an operator to access the mold (28). The power supply unit (42) may be configured to cut off the supply of power to the actuator (38) when the safety door (44) is opened. This configuration can secure operator's safety.

The present invention is not limited to the embodiments described above, and it goes without saying that the embodiments can be freely modified within a range that does not deviate from the essence and gist of the present invention as set forth in the appended claims.

What is claimed is:

1. A brake control device for an injection molding machine that includes a mold opening/closing mechanism configured to open and close a mold and generate mold clamping force, an actuator configured to drive the mold opening/closing mechanism, a power supply unit configured to supply power to the actuator, and a brake mechanism configured to apply braking force to the mold opening/closing mechanism, comprising:

a mold clamping force obtainer configured to obtain mold clamping force information indicating the mold clamping force of the mold opening/closing mechanism;

a mold clamping force decider configured to determine whether or not the mold clamping force of the mold opening/closing mechanism exceeds a predetermined value, based on the mold clamping force information; and a brake controller configured to actuate the brake mechanism when the mold clamping force decider determines that the mold clamping force of the mold opening/closing mechanism does not exceed the predetermined value and when the power supply unit cuts off the supply of power to the actuator, and configured not to actuate the brake mechanism when the mold clamping force decider determines that the mold clamping force of the mold opening/closing mechanism exceeds the predetermined value.

2. The brake control device for an injection molding machine according to claim 1, wherein:
the injection molding machine includes a mold clamping force detector configured to detect the mold clamping force of the mold opening/closing mechanism; and
the mold clamping force obtainer is configured to obtain the mold clamping force detected by the mold clamping force detector as the mold clamping force information.

3. The brake control device for an injection molding machine according to claim 1, wherein:
the actuator is a motor;
the injection molding machine includes a torque detector configured to detect a torque of the motor; and
the mold clamping force obtainer is configured to obtain the torque detected by the torque detector as the mold clamping force information.

4. The brake control device for an injection molding machine according to claim 1, wherein:
the actuator is a motor;
the injection molding machine includes a rotational position detector configured to detect a rotational position of the motor; and
the mold clamping force obtainer is configured to obtain the rotational position detected by the rotational position detector as the mold clamping force information.

5. The brake control device for an injection molding machine according to claim 1, wherein:
the mold opening/closing mechanism includes a ball screw, a crosshead including a nut screwed with the ball screw and a toggle mechanism configured to open and close the mold by moving the crosshead in an axial direction of the ball screw;
the injection molding machine includes a position detector configured to detect a position of the crosshead in the axial direction; and
the mold clamping force obtainer is configured to obtain the position of the crosshead detected by the position detector with respect to the axial direction as the mold clamping force information.

6. The brake control device for an injection molding machine according to claim 1, wherein:
the injection molding machine includes an openable safety door so as to enable an operator to access the mold; and
the power supply unit is configured to cut off the supply of power to the actuator when the safety door is opened.

7. A brake control method for an injection molding machine that includes a mold opening/closing mechanism configured to open and close a mold and generate mold clamping force, an actuator configured to drive the mold opening/closing mechanism, a power supply unit configured to supply power to the actuator, and a brake mechanism configured to apply braking force to the mold opening/closing mechanism, the method comprising:
a mold clamping force obtaining step of obtaining mold clamping force information indicating the mold clamping force of the mold opening/closing mechanism;
a mold clamping force deciding step of determining whether or not the mold clamping force of the mold opening/closing mechanism exceeds a predetermined value, based on the mold clamping force information; and
a brake controlling step of actuating the brake mechanism when the mold clamping force deciding step determines that the mold clamping force of the mold opening/closing mechanism does not exceed the predetermined value and when the power supply unit cuts off the supply of power to the actuator, and not actuating the brake mechanism when the mold clamping force deciding step determines that the mold clamping force of the mold opening/closing mechanism exceeds the predetermined value.

8. The brake control method for an injection molding machine according to claim 7, wherein:
the injection molding machine includes a mold clamping force detector configured to detect the mold clamping force of the mold opening/closing mechanism; and
the mold clamping force obtaining step obtains the mold clamping force detected by the mold clamping force detector as the mold clamping force information.

9. The brake control method for an injection molding machine according to claim 7, wherein:
the actuator is a motor;
the injection molding machine includes a torque detector configured to detect a torque of the motor; and
the mold clamping force obtaining step obtains the torque detected by the torque detector as the mold clamping force information.

10. The brake control method for an injection molding machine according to claim 7, wherein:
the actuator is a motor;
the injection molding machine includes a rotational position detector configured to detect a rotational position of the motor; and
the mold clamping force obtaining step obtains the rotational position detected by the rotational position detector as the mold clamping force information.

11. The brake control method for an injection molding machine according to claim 7, wherein:
the mold opening/closing mechanism includes a ball screw, a crosshead including a nut screwed with the ball screw and a toggle mechanism configured to open and close the mold by moving the crosshead in an axial direction of the ball screw;
the injection molding machine includes a position detector configured to detect a position of the crosshead in the axial direction; and
the mold clamping force obtaining step obtains the position of the crosshead detected by the position detector with respect to the axial direction as the mold clamping force information.

12. The brake control method for an injection molding machine according to claim 7, wherein:
the injection molding machine includes an openable safety door so as to enable an operator to access the mold; and
the power supply unit is configured to cut off the supply of power to the actuator when the safety door is opened.

* * * * *